United States Patent Office 3,352,371
Patented Nov. 14, 1967

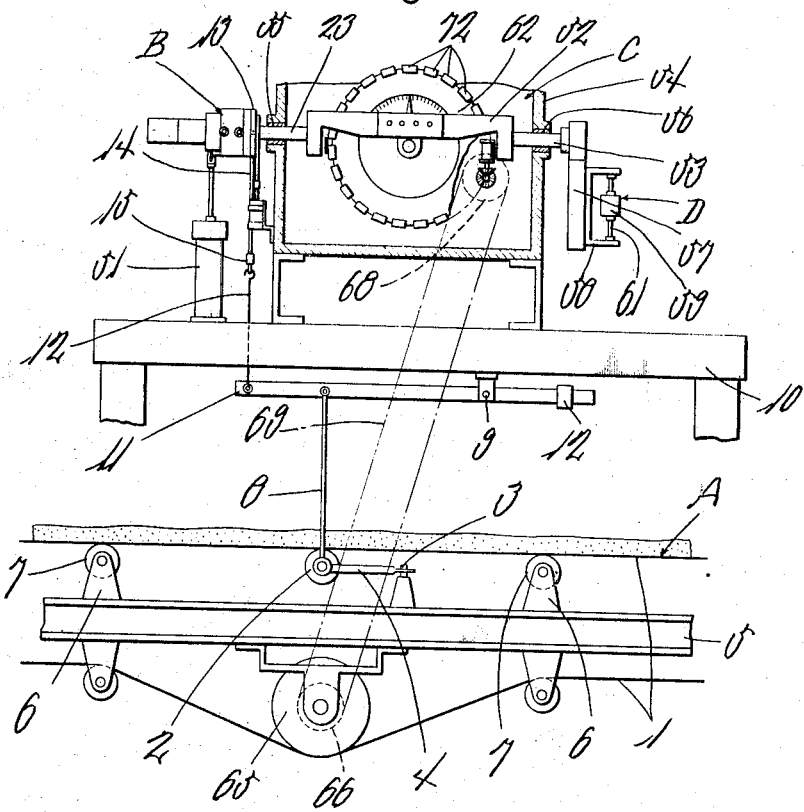

3,352,371
INTEGRATING CONVEYOR SCALE WITH MISALIGNMENT PREVENTION ARRANGEMENT
Koichi Tanaka, 54 8-chome, Hon-machi, Toyonaka, Osaka Prefecture, Japan
Filed Sept. 9, 1966, Ser. No. 578,194
Claims priority, application Japan, Oct. 30, 1963, 38/58,727
7 Claims. (Cl. 177—16)

This application is a continuation-in-part of application Ser. No. 407,494, filed Oct. 29, 1964, now abandoned.

The present invention relates generally to a weighing apparatus, designated as a conveyor weighing scale, measuring the weight of a material being transported by a belt conveyor.

A main object of the present invention is to improve the weighing accuracy by making the vertical displacement of a weighing roller so small as to be negligible and by diminishing the influence which changes of parameters in the belt conveyor exert upon weighing accuracy even if the load to be added to a weighing platform or the weighing roller (it will be hereinafter generally called a weighing roller) changes.

Another object of the present invention is the provision of an integrating conveyor scale which is highly accurate over a wide weighing range and which is connected to an integrating mechanism of an integrating conveyor scale, known as a Merrick-scale or Weightmeter, or such as is shown in U.S. Patent No. 1,875,485.

Usually, in weighing apparatus of this sort weighing has been carried out by balancing the tension of a spring produced by an inclination or a displacement of a scale beam, or the counter torque of a pendulum against a load due to the weight material.

In a such weighing means, if the load being transported along the conveyor belt changes, the weighing roller, which is connected through a proper level system to the scale beam, will be displaced in a vertical direction. Then, if the weighing roller is displaced, a misalignment occurs between said roller and an adjacent stationary roller. The weighing error due to this misalignment has been theoretically resolved by Hendrik Colijn in: Effect of Belt-conveyor Parameters on Belt-Scale Accuracy, 18th Annual ISA Conference and Exhibit, Sept. 9–12, 1963, Chicago.

According to him, if there is a misalignment produced between the weighing roller and the adjacent roller, an erroneous force depending on belt stiffness and belt tension of the conveyor belt is added to the weighing force detected by the weighing roller. Consequently, for a correct weighing he states that a correct alignment between the rollers when the material to be weighed is not loaded on the conveyor belt and a small displacement of the weighing roller when a load is applied must necessarily be presumed.

In an integrating conveyor scale, in order to operate the integrating mechanism an integrating disc is connected to a scale beam by a connecting rod and a crank or by a steel tape and a circular cam. In such a construction it is desirable, from the viewpoint of accuracy, to add a sufficiently higher input to the integrating mechanism to compensate for frictional resistance when the integrating disc is moved, but the displacement due to the load on the weighing roller is further increased by this measure. Also, the maximum angle of inclination of the integrating disc is restricted by a trigonometric error owing to the scale beam itself and the displacement or an inclination of the connecting means.

According to the present invention, the weighing force detected by the weighing roller is added through a proper lever system to a balance beam, and is balanced against a counter torque produced by an inclination of a pendulum. At this time, a servo-mechanism provided between the balance beam and the pendulum acts and forces the balance beam to return to its initial position.

Only the pendulum, therefore, is inclined when the load moving on the belt conveyor changes, and the displacement of the balance beam can be made negligible compared with that which is produced when the pendulum is connected mechanically to the usual balance beam.

Owing to this construction, if the weighing roller and the adjacent stationary one are once correctly aligned and the belt is positioned horizontally over the rollers when no material to be weighed is present on the conveyor belt, since the displacement of the weighing roller due to a load thereon can be neglected, no weighing error occurs due to a misalignment of the rollers.

Also, according to the present invention, the pendulum is provided on a frame rotatably supporting the integrating disc which is capable of inclining during the inclining of the pendulum.

In this case, the amount of force which can be exerted by the pendulum can be selected so as to be sufficiently large compared with the frictional force which must be overcome to include the integrating disc so as to increase the precision of the integrating mechanism. Also, since no trigonometric error is introduced into the weighing means during the inclining of the integrating disc, the maximum angle of inclination of the integrating disc can be selected so as to be larger than in conventional devices.

Owing to these constructions, the integrating conveyor scale of the present invention provides a wider weighing range and a higher weighing accuracy than usual.

Details thereof will be clear from the following specification and the accompanying drawings, in which:

FIGURE 1 is an elevation view, partially broken away, showing an embodiment of the apparatus according to the present invention;

FIGURE 2 is a side view of the integrating mechanism of the apparatus of the present invention;

Figure 3:
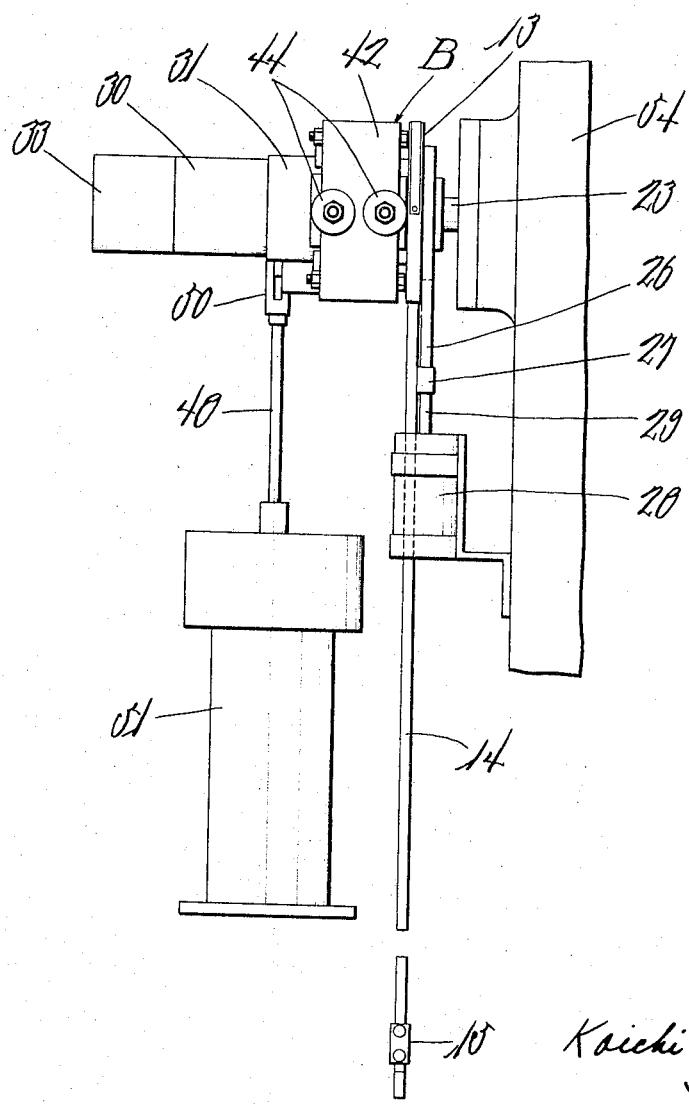
FIGURE 3 is an enlarged elevation view of the main part of the apparatus of the present invention.

In FIGURE 1 a belt conveyor A carries the material to be weighed, the return run of the conveyor belt being shown at 1. A weighing roller 2 beneath the upper run of belt A has one part rotatably mounted on an end of a lever 4 supported at a fulcrum 3 on a frame 5 for the conveyor A. Uprun and downrun of the weighing roller 2 are located stationary rollers 7 rotatably mounted in bearings 6 mounted on the frame 5.

The weighing roller 2 is connected through a link 8 to a lever 11, which is supported on a fulcrum 9 on a frame 10, and a weight 12 for balancing the tare weight is provided on said lever 11 so as to be moved therealong and fixed at any position. To one end of the lever 11 is connected the lower end of a suspending rod 12, and the lower end of a steel tape 14 is connected through a connecting fitting 15 to the upper end of said suspending rod 12. The upper end of the steel tape 14 is fixed to a circular cam 13 mounted on a balance beam B and is suspended from the outer periphery of the circular cam 13.

Figure 4:
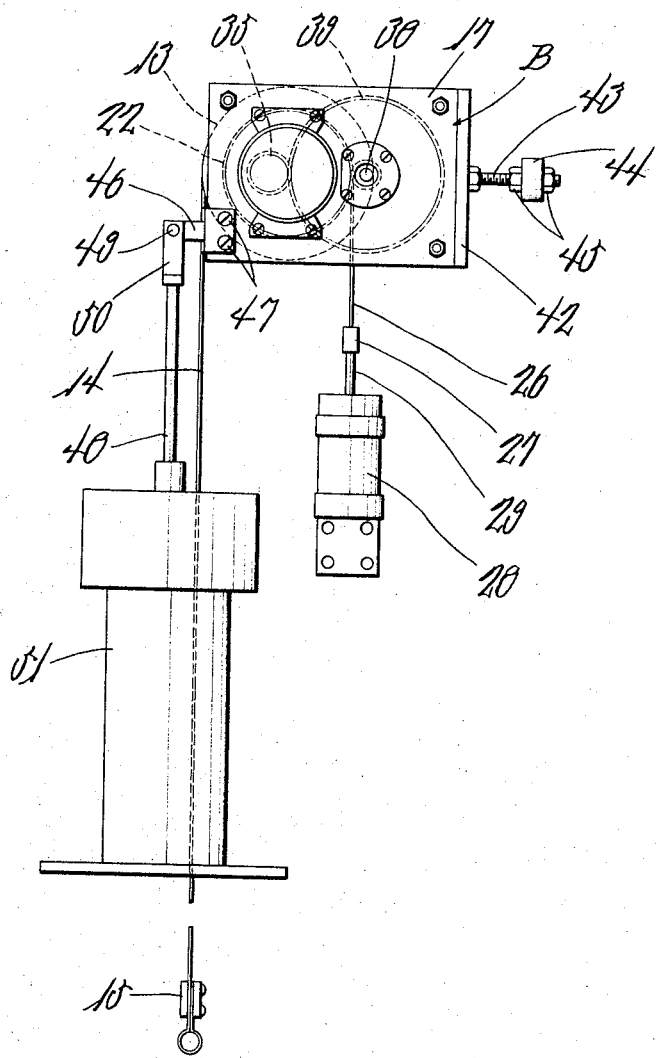
FIGURE 4 is a side view of the apparatus shown in FIGURE 3.
Figure 5:
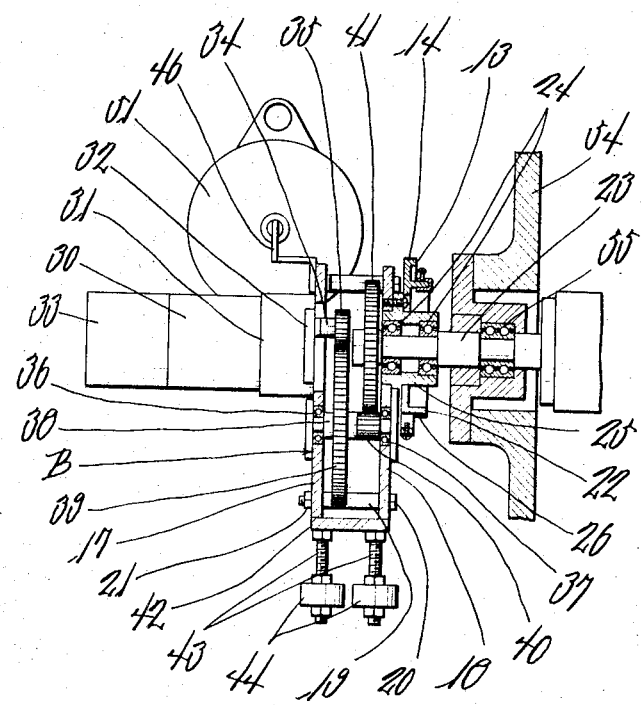
FIGURE 5 is a plan view of the apparatus as shown in FIGURE 3, the main part of which is shown in cross section.

As shown in FIGURES 3–5, the balance beam B is constructed by positioning two plates 17 and 18 parallel to each other and spacing the plates by tubular distance pieces 19 and connecting the plates by bolts 20 extending through said distance pieces and each having a nut 21 thereon. On one plate 18 of said balance beam is fixed said circular cam 13 and a second circular cam 22 concentric therewith, and a metal fitting 25 having a bearing 24 thereon rotatably supporting a horizontal shaft 23 is positioned within said cams and is attached to plate 18. A steel tape 26 has the upper end fixed to the circular cam 22 and hangs from the outer periphery of the circular cam 22 on the opposite side of the axis of the cams from said steel tape 14 and has a suspending rod 29 and a connecting fitting 27 on the lower end thereof from which is suspended an iron core 77 (see FIGURE 6) of a differential transformer 28. The centers of said circular cams 13 and 22 coincide with the center line of the horizontal shaft 23. On the other plate 17 forming part of the balance beam B is mounted a reduction gear head 31 of a servo-motor 30, which gear head is fixed on a metal stop fitting 32. A tachometer dynamo 33 is directly connected to said servo-motor 30. A gear 35 is mounted on an output shaft 34 of the gear head 31 of the servo-motor 30, and said gear 35 meshes with a gear 39 fixed to an intermediate shaft 38 rotatably mounted in aligned bearings 36 and 37 in the two plates 17 and 18. Another gear 40 is fixed to the intermediate shaft 38, and said gear 40 engages with a gear 41 fixed to said horizontal shaft 23.

At one end of the two plates 17 and 18 is mounted a plate 42 extending at right angles to said plates 17 and 18, and on said plate 42 are two bolts 43. Adjusting weights are threaded onto the bolts 43 for balancing the initial force added to the balance beam B by the steel plate 14 and the cam 15, and the position of the weights are fixed by nuts 45.

An arm 46 is secured to one end of the plate 17 of the balance beam B by screws 47 and a suspending fitting 50 is rotatably mounted on said arm 46 by a pin 49. The suspending fitting 50 is on the upper end of a suspending rod 48. A dashpot 51 is provided in which is a movable member attached to the end of suspending rod 48 and in which damping oil having a suitable viscosity is contained.

As seen in FIGURE 1, an integrating mechanism C is provided on the frame 10, and said horizontal shaft 23 is connected to one side of a supporting frame 52 of an integrating disc of the integrating mechanism, and a shaft 53 is connected to the other side of supporting frame 52. Horizontal shafts 23 and 53 are rotatably supported in bearings 55 and 56 mounted in a casing 54 of the integrating mechanism. A weight 57 is mounted on the horizontal shaft 53 and has a pendulum D thereon comprising a supporting fitting 58 mounted on the weight 57, a set screw 47 on the fitting 58, and a stud bolt 61 on the fitting 58 and having an adjusting weight 59 and locking nuts 60 threaded thereon.

The relative positions of said pendulum D and the integrating disc 62 are such that the disc 62 is perpendicular when the center of gravity of the pendulum D is in a vertical plane including the shaft 53.

The integrating mechanism C also comprises an endless belt 63 supported on four rollers 64 rotatably mounted on the casing 54, and said belt 63 is held in contact with disc rollers 72 on the outer periphery of the integrating disc 62 as it moves. The belt 63 is driven from the conveyor A by an endless chain 69 extending around a sprocket 66 mounted on the roller 65 which is in contact with the belt 1 of the belt conveyor A and is rotated thereby, and a sprocket 68 mounted on a rotating shaft 67 rotatably mounted on the casing 54 and having a bevel gear 70 thereon engaged with a bevel gear 71 fixed to one of said rollers 64.

Figure 6:
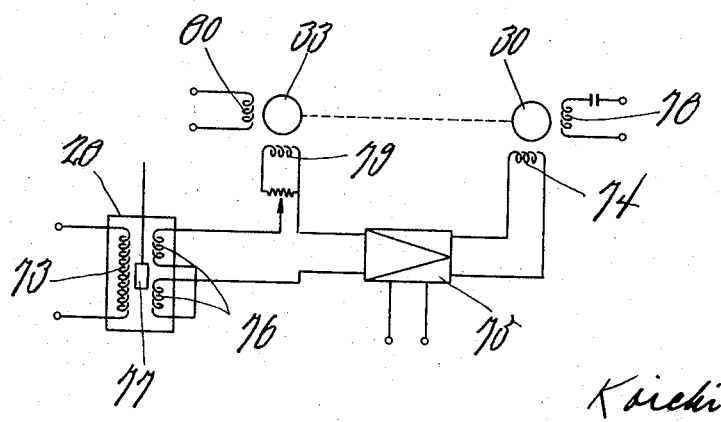
FIGURE 6 is a circuit diagram of the apparatus of the present invention.

As shown in FIGURE 6, a primary coil 73 of the differential transformer 28 is supplied with a definite voltage, and the output voltage produced in a secondary coil 76 depends on the displacement of the movable iron core 77. The output of the secondary coil 76 is amplified by a servo-amplifier 75 and is added to a controlling coil 74 of the servo-motor 30. An exciting coil 78 is provided for the servo-motor 30, and an exciting coil 80 is provided for the tachometer dynamo 33. The tachometer dynamo 33 has an output coil 79.

When there is no material being conveyed on the belt conveyor A, no rotational force is applied to the horizontal shaft 23 and the integrating disc 26 is in a vertical position. Consequently, even if the endless belt 63 moves at a velocity proportional to the belt velocity of the conveyor A, the integrating disc 62 stands still.

At this time, an initial downward force produced by the steel tape 14 is transmitted to the circumference of the cam 13 and tends to cause the balance beam B to rotate around the horizontal shaft 23 in the counterclockwise direction in FIGURE 4. This torque is balanced by a force tending to rotate the balance beam B around the horizontal shaft 23 in the clockwise direction which is due to rightward movement of the center of gravity of the balance beam B, as shown in FIGURE 4, by adjustment of the position of the adjusting weight 44 on the balance beam B.

The position of the balance beam B is controlled by the servo-mechanism so that the balance beam B will stop at the position where the output voltage of the differential transformer 28 becomes zero. When the balance beam B stands still, the voltage supplied to the controlling coil 74 of the servo-motor 30 shown in the circuit diagram of FIGURE 6 is zero, so that no torque is produced in the servo-motor 30. Therefore, a force causing the horizontal shaft 23 to rotate does not occur. In such situation, the relative position of the differential transformer 28 and the balance beam B is such that the balance beam B is kept horizontal, and a length of the link 8 is such that alignment between the weighing roller 2 and the adjacent stationary roller 7 will be kept correct.

The relative position of the individual elements as just described are the normal positions after the initial adjustment of the weighing apparatus according to the present invention.

If a load is added to the weighing roller 2 by material conveyed on the conveyor A, the downward force due to the load is added to the initial force due to the weight of the steel tape 14 and forces the balance beam B to rotate in the counterclockwise direction in FIGURE 4. Then, since the iron core 77 of the differential transformer 28 is lifted by the steel tape 26, an output voltage is produced in the secondary coil 76 of the differential transformer 28 shown in FIGURE 6. Said voltage is amplified by the servo-amplifier 75 and supplied to the controlling coil 74 of the servo-motor 30 so that a rotational force is produced by the servo-motor 30. This rotation is transmitted to the horizontal shaft 23 through the gears 35, 39, 40 and 41. The horizontal shaft 53 on which the disc-supporting frame 52 of the integrating mechanism C, the integrating disc 62 and the pendulum D are mounted is also rotated by this rotation.

Then, since a rotational force which is proportional to the angle of inclination of the pendulum from the vertical position and which is opposite to the rotational force applied by servo-motor 30 is applied to the horizontal shaft 53, the horizontal shaft 53 rotates together with the frame 52, the integrating disc 62 and the horizontal shaft 23 until the two rotational forces balance.

Since the rotational force supplied by the servo-motor 30 operates to cause relative rotation between the balance beam B and the horizontal shaft 23, the rotational force causing the balance beam B to rotate around the horizontal shaft 23 due to a downward force corresponding to the load adds a stalling torque to the steel tape 14 at the stationary condition of the servo-motor 30 and balances against a counter torque due to the inclination of the pendulum D.

A high gain servo amplifier 75 amplifies the output voltage of the differential transformer 28 which is produced by a slight inclination of the balance beam B from its horizontal position and supplies to the servo-motor 30 a large rotational force, that is, sufficient electric power to produce a rotational force which is several times the counter torque of the pendulum D required to balance a maximum input load. Consequently, if the input supplied to the steel tape 14 is varied, the balance beam B is controlled by the servo-mechanism to restore it always to the horizontal position.

The tachometer dynamo 33 revolves together with the servo-motor 30, a voltage which is proportional to the rotational velocity of the servo-motor 30 being produced in the output coil 79, and by feeding said voltage back to the amplifier 75, the motion of the balance beam B and the pendulum D can be stabilized.

Therefore, the vertical displacement of the weighing roller 2 connected to the balance beam B through the steel tape 14, the suspending rod 12 and the lever 11, due to a variation of the load on the conveyor belt 1 becomes very slight.

Now, representing the angular velocity of the integrating disc 62 of the well-known disc-belt type of integrating mechanism C as $w$, the velocity of the endless belt 63 as $v$, the radius of the integrating disc 62 as R and the angle of inclination of the integrating disc 62 as O, $$R \cdot w = v \cdot \sin O \quad (1)$$

is obtained. Denoting the force which is produced on the steel tape by the weight of the weighed material moving on the conveyor belt 1 and detected by the weighing roller 2 as $p$, the radius of the circular cam as D, the weight of the pendulum as W, and the distance from the center of the horizontal shaft 53 to the center of gravity of the pendulum D as L, we have $$D \cdot p = W \cdot L \sin \quad (2)$$

$$w = \frac{D}{PWL} \cdot Pv \quad (3)$$

Consequently, the angular velocity $w$ of the integrating disc 62 corresponding to the weight of the weighed material being transported per unit of time at that particular moment by the belt conveyor is proportional to the product of the velocity $v$ of the conveyor belt 1 and the force $p$ proportional to the instantaneous load. Since no trigonometric error due to the connection of the usual pendulum type weighing apparatus and disc-belt type integrating mechanism occurs and the maximum angle of inclination of the integrating disc 62 can be selected to be larger, the integration of the exact weight of the weighed material can be accomplished over a wider weighing range.

It is apparent that various embodiments other than those described hereinbefore can be devised without departing from the scope of the invention as set forth in the following claims.

What is claimed is:

1. A weighing apparatus, comprising a horizontal rotatable shaft, a pendulum fixed to said shaft for producing a counter torque on said shaft proportional to the angle of rotation of said shaft when said shaft is turned, a balance beam rotatably mounted on said shaft, a load supporting structure, means coupling said load supporting structure and said balance beam and tending to rotate said balance beam around said shaft when a load is on said load supporting structure, a servo-motor coupled to said balance beam, position detecting means coupled to said balance beam and to said servo-motor for actuating said servo-motor to produce a torque proportional to the displacement of said balance beam, said servo-motor being coupled to said shaft for rotating said shaft when it is driven for producing a torque on said shaft proportional to the weight being weighed, the shaft rotating until said pendulum produces a counter torque equal to said servo-motor produced torque, whereby said balance beam is maintained in the horizontal position being balanced on said shaft.

2. A weighing apparatus as claimed in claim 1 in which said load supporting structure is a weighing member over which a belt conveyor is adapted to run, and a stationary roller adjacent said weighing member, and said apparatus further comprises an integrating disc-belt type integrating mechanism, a frame on which the integrating disc is rotatably mounted, said frame being fixed to said horizontal shaft and the belt of said integrating mechanism being in a fixed position relative to said disc and shaft, and means coupling said belt of said integrating mechanism to said belt conveyor.

3. A weighing apparatus as claimed in claim 2 in which said load supporting structure is a weighing roller.

4. A weighing apparatus as claimed in claim 2 in which said load supporting structure is a weighing platform.

5. A weighing apparatus as claimed in claim 1 in which said balance beam has a gear train thereon coupled between said servo-motor and said horizontal shaft.

6. A weighing apparatus as claimed in claim 1 in which said balance beam has a circular cam thereon concentric with said horizontal shaft, and a flexible tape connected between the periphery of said circular cam and said load supporting structure.

7. A weighing apparatus as claimed in claim 1 in which said position detecting means comprises a differential transformer having a movable core, the output of said transformer being coupled to said servo-motor, and a further circular cam on said balance beam concentric with said horizontal shaft and having a tape attached to the periphery thereof and having the transformer core suspended therefrom.

References Cited

UNITED STATES PATENTS

| | | | |
|---|---|---|---|
| 1,875,485 | 9/1932 | Okada | 177—16 |
| 2,918,269 | 12/1959 | Williams | 177—16 |
| 2,925,261 | 2/1960 | John | 177—214 |
| 3,141,516 | 7/1964 | Moring et al. | 235—61 |
| 3,198,429 | 8/1965 | Williams | 177—16 X |

RICHARD B. WILKINSON, *Primary Examiner.*

ROBERT S. WARD, JR., *Assistant Examiner.*